United States Patent
Tamiya et al.

(10) Patent No.: US 10,144,235 B2
(45) Date of Patent: Dec. 4, 2018

(54) PRINTING PROCESS SYSTEM, PRINTING PROCESS METHOD, PRINTING MANAGEMENT DEVICE, AND PRINTING MANAGEMENT PROGRAM

(71) Applicant: Seiko Epson Corporation, Tokyo (JP)

(72) Inventors: Yuji Tamiya, Sapporo (JP); Ryosuke Kasamatsu, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/391,246

(22) Filed: Dec. 27, 2016

(65) Prior Publication Data

US 2017/0182821 A1    Jun. 29, 2017

(30) Foreign Application Priority Data

Dec. 28, 2015  (JP) .................. 2015-256562

(51) Int. Cl.
*B41J 29/38* (2006.01)
*G06F 3/12* (2006.01)

(52) U.S. Cl.
CPC .............. *B41J 29/38* (2013.01); *G06F 3/123* (2013.01); *G06F 3/1205* (2013.01); *G06F 3/1208* (2013.01); *G06F 3/1225* (2013.01); *G06F 3/1285* (2013.01); *G06F 3/1255* (2013.01)

(58) Field of Classification Search
CPC ..... G06F 3/1205; G06F 3/1253; G06F 3/1204
See application file for complete search history.

(56) References Cited

U.S. PATENT DOCUMENTS

| | | | | |
|---|---|---|---|---|
| 7,855,799 B2* | 12/2010 | Shah | ..................... | G06F 3/1204 358/1.15 |
| 8,031,347 B2* | 10/2011 | Edwards | ................ | G06K 15/16 358/1.1 |
| 8,249,801 B2* | 8/2012 | Sakai | ..................... | G01C 21/32 342/357.2 |
| 2002/0140959 A1* | 10/2002 | Harper | .................. | G06F 3/1207 358/1.13 |
| 2004/0012804 A1* | 1/2004 | Kasuga | ................. | G06F 3/1205 358/1.13 |
| 2004/0218197 A1* | 11/2004 | Vliembergen | ......... | G06K 15/00 358/1.6 |
| 2009/0279115 A1* | 11/2009 | Martin | .................. | G06F 3/1204 358/1.13 |
| 2010/0085591 A1 | 4/2010 | Arai | | |
| 2010/0097649 A1 | 4/2010 | Akiyama | | |

FOREIGN PATENT DOCUMENTS

JP    2010-102398 A    5/2010
JP    2015-182226 A    10/2015

* cited by examiner

*Primary Examiner* — John P Zimmermann
(74) *Attorney, Agent, or Firm* — Nutter McClennen & Fish LLP

(57) ABSTRACT

A RIP device which receives image data and print media designation from a PC performs a data generating process by adopting a process parameter corresponding to the designated print media among process parameters stored in a loop-up table (LUT). A printer performs a printing process by adopting a printing parameter corresponding to the designated print media among the printing parameters stored in the LUT. The process parameter and the printing parameter are associated by a media number which is applied by a management server.

11 Claims, 7 Drawing Sheets

FIG. 3

| PRINT MODEL NUMBER | MEDIA TYPE | ICC PROFILE | PRINT SETTING | MECHANICAL PARAMETER |
|---|---|---|---|---|
| AAA | aaa | | | |
| | bbb | | | |
| | ccc | | | |
| | ⋮ | ⋮ | ⋮ | ⋮ |
| BBB | aaa | | | |
| | bbb | | | |
| | ddd | | | |
| | ⋮ | ⋮ | ⋮ | ⋮ |
| CCC | eee | | | |
| | fff | | | |
| | ggg | | | |
| | ⋮ | ⋮ | ⋮ | ⋮ |

301

MEDIA INFORMATION: PROCESS PARAMETER (ICC PROFILE, PRINT SETTING), PRINTING PARAMETER (MECHANICAL PARAMETER)

| MEDIA NUMBER | MECHANICAL PARAMETER |
|---|---|
| 1 | |
| 2 | |
| 3 | |
| ⋮ | ⋮ |
| 30 | |

FIG. 5

| PRINT MODEL NUMBER | MEDIA TYPE | MEDIA NUMBER | ICC PROFILE | PRINT SETTING |
|---|---|---|---|---|
| AAA | aaa | 1 | | |
| | bbb | 2 | | |
| | ccc | 3 | | |
| | ⋮ | ⋮ | ⋮ | ⋮ |
| BBB | bbb | 1 | | |
| | ddd | 2 | | |
| | hhh | 3 | | |
| | ⋮ | ⋮ | ⋮ | ⋮ |

612

PRINTING PROCESS SYSTEM, PRINTING PROCESS METHOD, PRINTING MANAGEMENT DEVICE, AND PRINTING MANAGEMENT PROGRAM

CROSS REFERENCE TO RELATED APPLICATION

The present application claims priority under 35 U.S.C. § 119 to Japanese Application No. 2015-256562, filed on Dec. 28, 2015.

BACKGROUND

1. Technical Field

The present invention relates to a printing process system for performing printing by adapting a data process for generating print data and a printing process based on the print data to print media.

2. Related Art

In the printing process system that performs printing to print media, there are many cases that a printer performing a printing process to the print media and a data processing unit performing a data generating process that generates print data to be applied on the printer are provided on different apparatuses. For example, in general, a data process is performed on a computer and the print data is generated, and a printer which is communicatively connected to the computer receives the print data to execute the printing process.

For example, in a technique described in JP-A-2010-102398, print data which is generated on a computer is applied with respect to a printing apparatus which stores a plurality of sheets having different sizes or types. In the meantime, in the computer, print data is generated by a color matching using an international color consortium (ICC) profile in accordance with characteristics of the selected sheet, and an operation setting of the printer such as a sheet feeding conditions or the like is dependent on the sheet.

The related art relates to a printer driver which is mounted on a computer and has a function for generating print data and a function for remotely controlling an operation of a printer. However, in this type of printing process system, there is also a case where a data processing unit does not have a function for directly controlling a detailed operation condition of the printer. For example, a function for grasping is not necessarily included in raster image processor (RIP) software or hardware which performs professionally generating bitmap-developed printing data.

In such a case, in order to obtain a printing product with high quality by completing the printing, it is necessary to match the print media which is to be the target between a data processing unit and the printer. However, in these devices, since adapting the settings for the device to the print media is separately performed, it is not guaranteed that the settings relating to the print media are matched with each other. Therefore, it is required to establish a management technique which can more reliably match the settings relating to the print media between the data processing unit and the printer.

SUMMARY

An advantage of some aspects of the exemplary embodiments of the invention is that a printing product with high quality can be obtained by matching the settings relating to the print media between a data processing unit and a printer.

According to an aspect of at least one exemplary embodiment of the invention, there is provided a printing process system including a data processing unit that generates print data including information for designating the print media by a data generating process; a printing unit that includes a storage unit that stores a printing parameter and executes a printing process using the printing parameter corresponding to the print media which is designated by the print data; and a parameter management unit that applies a process parameter relating to the print media in the data generating process to the data processing unit and applies the printing parameter relating to the print media in the printing process to the printing unit.

The parameter management unit acquires the media information for adopting the data generating process and the printing process to the print media from the outside of the parameter management unit, for at least one print medium, specifies the process parameter and the printing parameter respectively, from the media information, and associates the printing parameter with the media specifying information for specifying the print media corresponding to the printing parameter to store the associated printing parameter and the media specifying information on the storage unit.

The data processing unit acquires the process parameter and the media specifying information for specifying the print media corresponding to the process parameter from the parameter management unit, executes the data generating process using the process parameter and the media specifying information, and generates the print data which designates the print media.

In addition, according to another aspect of at least one exemplary embodiment of the invention, there is provided a printing process method in a printing process system including a data processing unit that generates print data including information for designating print media and a printing unit that executes a printing process in accordance with the print media designated by the print data. A parameter management unit manages a process parameter relating to the print media in the data generating process by the data processing unit and a printing parameter relating to the print media in the printing process by the printing unit is provided in the printing process system.

The parameter management unit acquires the media information for adopting the data generating process by the data processing unit and the printing process by the printing unit to the print media from the outside of the parameter management unit, for at least one print media, specifies the process parameter and the printing parameter, respectively from the media information, associates the printing parameter with the media specifying information for specifying the print media corresponding to the printing parameter to store the associated printing parameter and the media specifying information on the storage unit which is included in the printing unit, and transmits the process parameter and the media specifying information to the data processing unit according to a requirement from the data processing unit.

The data processing unit acquires the process parameter and the media specifying information corresponding to the print media to be a target of the printing process from the parameter management unit, executes the data generating process using the process parameter, and outputs the print data which designates the print media by the media specifying information. In addition, the printing unit executes the printing process using the printing parameter corresponding to the designated print media which are stored in the storage unit.

In the printing process system and the printing process method which is configured as described above, any of the process parameter relating to the print media in the data generating process by the data processing unit and the printing parameter relating to the print media in the printing process by the printing unit is specified from the media information which is acquired by the parameter management unit. The specified process parameter and the printing parameter apply the media specifying information for specifying the print media to the data processing unit and the printing unit, respectively. Accordingly, the data processing unit and the printing unit can maintain the information corresponding to the same print media. In addition, it is not necessary that the data processing unit and the printing unit separately acquire the media information, respectively, and it is not necessary to require a user to acquire the media information.

The printing unit executes the printing process which is applied to the print media designated by the media specifying information among the information items included in the print data which is generated by the data processing unit. Therefore, the printing process in accordance with the print media which are to be a target in the data generating process by the data processing unit is executed, and there is no inconsistency in the print media between the data processing unit and the printing unit. That is, in the printing process system according to at least one exemplary embodiment of the invention, the printing product with high quality can be obtained by reliably matching the settings relating to the print media between the data processing unit and the printing unit.

In addition, according to still another aspect of at least one exemplary embodiment of the invention, there is provided a printing management device that manages a printing process system including a data processing unit that generates print data including information for designating print media and a printing unit that executes a printing process in accordance with the print media designated by the print data. The printing management device includes an information acquisition unit that acquires media information for adopting a data generating process by the data processing unit and a printing process by the printing unit to the print media from the outside, for at least one print media; a parameter specifying unit that specifies a process parameter relating to the print media in the data generating process and a printing parameter relating to the print media in the printing process respectively, from the media information; a printing parameter setting unit that associates the printing parameter with media specifying information for specifying the print media corresponding to the printing parameter to store the associated printing parameter and the media specifying information on a storage unit which is included in the printing unit; and a process parameter transmitting unit that transmits the process parameter and the media specifying information to the data processing unit according to a requirement from the data processing unit.

In the exemplary configuration described above, it is possible to obtain an effect of preventing inconsistency between print media assumed in the data generating process by the data processing unit and print media assumed in the printing process by the printing unit. Accordingly, the printing product with high quality can be obtained by reliably matching the settings relating to the print media between the data processing unit and the printing unit.

In addition, according to still another aspect of at least one exemplary embodiment of the invention, there is provided a printing management program for managing a printing process system including a data processing unit that generates print data including information for designating print media by a data generating process and a printing unit that executes a printing process in accordance with the print media which is designated by the print data. The printing management program causes a computer which is capable of communicating with the data processing unit and the printing unit to acquire the media information for adopting the data generating process by the data processing unit and the printing process by the printing unit to the print media from the outside of the printing process system, for at least one print medium, to specify the process parameter relating to the print media in the data generating process and the printing parameter relating to the print media in the printing process respectively, from the media information, to associate the printing parameter and the media specifying information for specifying the print media corresponding to the printing parameter to store the associated printing parameter and the media specifying information on a storage unit which is included in the printing unit, and to transmit the process parameter and the media specifying information to the data processing unit according to a requirement from the data processing unit.

A function of each exemplary configuration of the above-described printing management device can be realized using a hardware source of a computer apparatus. From these reasons, it is possible to embody the invention as a printing management program which causes the computer to realize the function of the above-described printing management device. By mounting and executing the printing management program on the computer, it is possible to obtain the printing product with high quality by reliably matching the settings relating to the print media between the data processing unit and the printing unit in the printing process system including the data processing unit and the printing unit.

In the invention, according to at least one exemplary embodiment, the parameter management unit may be configured such that the media information corresponding to at least one print medium from a data server for holding a plurality of sets of the media information items corresponding to each of the plurality of sets of the print media is acquired. In this case, the data server may be the different external device from the printing process system and may be a part of the configuration of the printing process system. By providing such a data server, the media information can be uniform-management on the data server and maintenance such as addition, elimination, or change of the media information can be efficiently performed.

In addition, for example, the parameter management unit may have a configuration that a receiving unit that receives a designation input relating to the print media is included and the media information corresponding to the print media designated by the input to the receiving unit is acquired. According to this configuration, it is possible to reliably acquire necessary media information on the print media which is desired by a user who operates the receiving unit and to use the information for printing.

In addition, for example, the storage unit may store the printing parameter corresponding to a plurality types of print media and the media specifying information. According to this configuration, when the print media which are to be a target of the printing process in the printing unit are changed, there is no need to newly set the printing parameter each time. The data processing unit designates one of the plurality of print media in which the printing parameter is stored in the storage unit in the print data and the printing unit executes the printing process using the printing parameter corresponding to the designated print media. Therefore, it is possible to perform printing adapted to the print media.

In addition, for example, the printing process system may include a plurality of data processing units, at least one printing unit, and at least one parameter management unit which are mutually connected via a local area network. In a case where a plurality of data processing units are included in one system, it is necessary for each individual data processing unit to match the print media to be a target between the printing units. The same applies to a case where a plurality of printing units are included in one system. By controlling the providing of the process parameter to the each individual data processing unit and the providing of the printing parameter to the printing unit by at least one parameter management unit, it is possible to reliably match the information items. If there is a single parameter management unit in the system, it is possible to reduce or avoid the confusion caused by the inconsistent process between a plurality of parameter management units in advance.

In addition, for example, the parameter management unit may have a configuration that when the media information is newly acquired, the printing parameter and the media specifying information of the storage unit are updated, the update of the process parameter is notified to the data processing unit, and the process parameter and the media specifying information are transmitted to the data processing unit which responses to the notification. For the printing unit, it is desired that the newly printing parameter is rapidly reflected. Therefore, it is effective that the function updating the printing parameter which is held by the printing unit is provided in the parameter management unit. In addition, since it is not necessary that the data processing unit always be activated, the update of the process parameter is notified and the process parameter is transmitted to the data processing unit having the response. In this manner, it is possible to match the information relating to the print media in the data processing unit with the information included in the printing unit.

All the plurality of components included in each of the aspects of the invention described above are not essential, but some components among the plurality of components may be appropriately changed, omitted or replaced with other components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one exemplary aspect of the invention described above may be combined with part or all of the technical features included in another exemplary aspect of the invention described later to provide still another independent aspect of the invention.

BRIEF DESCRIPTION OF THE DRAWINGS

Exemplary embodiments of the invention will be described with reference to the accompanying drawings, wherein like numbers reference like elements.

FIG. 3 is a diagram illustrating an example of a media list.

FIG. 4 is a diagram illustrating an example of a look-up table of a printer.

FIG. 5 is a diagram illustrating an example of a look-up table of a RIP device.

DETAILED DESCRIPTION

Figure 1:
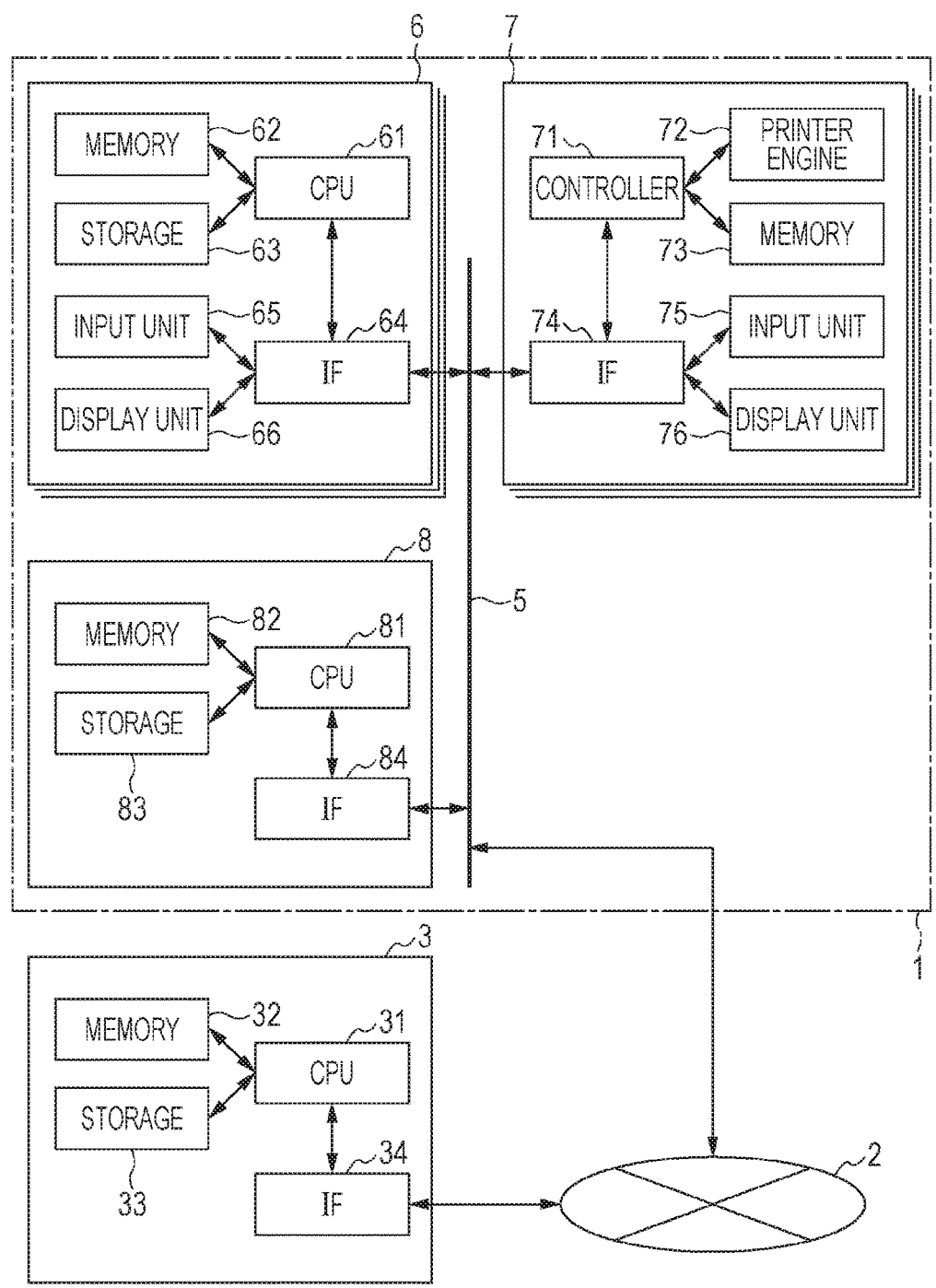
FIG. 1 is a block diagram illustrating an example configuration of a printing process system according to an exemplary embodiment of the invention.

FIG. 1 is a block diagram illustrating an example configuration of a printing process system according to an exemplary embodiment of the invention. A printing process system 1 includes a personal computer (hereinafter, referred to as a "PC") 6, a printer 7, and a management server 8, and is configured as a local area network (hereinafter, referred to as a "LAN") in which the PC 6, the printer 7, and the management server 8 are connected in a communicable manner. More specifically, information terminal devices such as the PC 6, the printer 7, and the management server 8 are connected to a LAN line 5, which is connected to an Internet communication network 2 that is a public communication line via a router (not illustrated). A plurality of the information terminal devices may be included in the printing process system 1. In addition, the connection between the above-described configuration elements may be wired or wireless as long as the configuration elements can be mutually communicated with each other.

At least one data server 3 for maintaining data for appropriately operating the printing process system 1 and various information items such as firmware for adding or improving its functions is connected to the Internet communication network 2. The printing process system 1 can acquire these information items by accessing the data server 3 as necessary.

The PC 6 which is provided in the printing process system 1 has the same hardware configuration as the configuration of the general personal computer. That is, the PC 6 includes a central processing unit (CPU) 61 that administers a control and an arithmetic processing of each section of the PC, a memory 62 which temporarily saves arithmetic data, a storage 63 that stores and saves a control program to be executed by the CPU 61 and various types of data items, an interface (IF) 64 which performs a communication between the PC and the outside, an input unit 65 which receives an operation input from a user, and a display unit 66 which performs various types of notifications to the user. The CPU 61, the memory 62, the storage 63, the IF 64, the input unit 65, and the display unit 66 are electrically connected and perform data exchanging mutually.

The printer 7 also has the same hardware configuration as the general configuration of a network printer. That is, the printer 7 includes a controller 71 which performs a control of each unit of the printer and a data process, a printer engine 72 which executes a printing operation to media (print medium), a memory 73 which temporarily saves image data, an interface (IF) 74 which performs a communication between the printer and the outside, an input unit 75 which receives an operation input from a user, and display unit 76 which performs various types of notifications to the user. The controller 71, the printer engine 72, the memory 73, the IF 74, the input unit 75, and the display unit 76 are electrically connected and perform data exchanging mutually. Hereinafter, as an example, the printer engine 72 will be described as an ink jet type printer engine. However, the printing method is not limited thereto.

Since the printer 7 can receive a large amount of image data, the printer 7 may include storage in the same manner as the PC 6. In addition, at least one of the input unit 75 and the display unit 76 may be simplified and omitted on the assumption that a user interface is realized on the PC 6. In addition, the printer 7 is included in the system as a so-called network printer, and included in the printing process system 1 as a so-called local printer to be connected to the PC 6 without through the LAN line 5.

The management server 8 has a function for managing the printing process system 1 which is formed of various terminal devices to be mutually connected via the LAN line 5. The configuration may be the same configuration as that of the general PC and may be a server dedicated machine in which the input unit and the display unit, which are provided as a user interface, are simplified and omitted. Specifically, the management server 8 includes a CPU 81, a memory 82, a storage 83, an interface (IF) 84, and/or the like.

Also in the configuration of the data server 3, a CPU 31, a memory 32, a storage 33, and an interface (IF) 34 are provided, in the same manner as the management server 8. As described below, the data server 3 is intended to hold the data accumulated therein in a state where it can be delivered through the Internet communication network 2 and may have a configuration specialized for such a function as a data publishing server. The printing process system 1 can access the data server 3 via the Internet communication network 2. It may be the case, in some example embodiments, that a plurality of printing process systems can access the data server 3.

The printing process system 1 is a system for printing an image of the content which is designated by the user who operates the PC 6 on the designated print media. As the image to be printed, there are various types of images such as a text image which is generated by document generating software, a graphic image which is formed by a drawing software, a photographic image which is imaged by a digital camera, and an image which is read by a scanner. In addition, as the print media, there are various types of media such as a material (paper, a resin film, a cloth, or the like) and media which is formed by a combination of the optical characteristics (color, transparency, presence and absence of the gloss, or the like) and a form thereof (the sheet-like shape, a rolled shape, a three-dimensional molded product, or the like).

Figure 2:
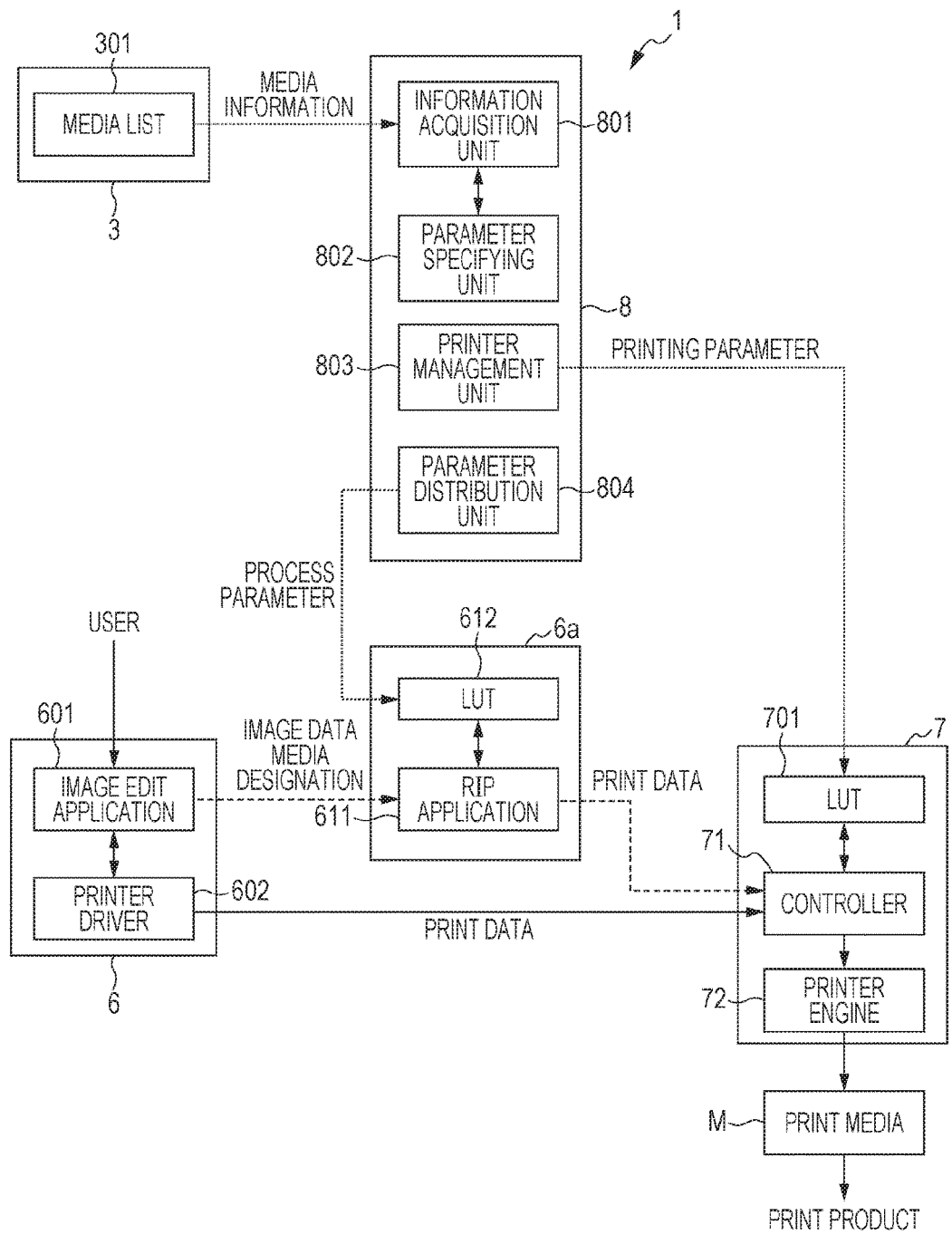
FIG. 2 is a schematic diagram illustrating a flow of data in the printing process system.

FIG. 2 is a schematic diagram illustrating a flow of data in the printing process system. In each of the PC 6, the printer 7, and the management server 8, which configure the printing process system 1 and the data server 3 to be connected to the printing process system 1 via the Internet communication network 2, by executing the control program which is generated in advance by each configuration element having the hardware configuration illustrated in FIG. 1, each functional block illustrated in FIG. 2 is realized by the hardware or the software.

In the PC 6 to be operated by the user, by executing the program which is recorded on the storage 63 in advance by the CPU 61, a functional block such as an image edit application 601 and a printer driver 602 of the above-described document generating software or the drawing software is realized. When the user desires to print the image edited using the image edit application 601, after the print media to be printed or the other print condition is designated, the operation input for designating a print execution to the image edit application 601 is performed from the input unit 65.

When the input is received, the setting information relating to the image data and the print condition is received and transmitted from the image edit application 601 to the printer driver 602. The printer driver 602 is a control program, which is specialized for controlling the printer 7, performs a data generating process based on the image data and the setting information indicating the content of the image to be printed, generates the print data corresponding to printer 7, and transmits the generated print data to the printer 7. For example, various types of the data processes such as a color conversion process for developing the RGB-represented image data into raster data (bitmap data) of the ink color of the printer 7, a rotate or reverse process, and a gamma correction process are included in the data generating process.

The data generating process is a process for generating the print data which is matched with the designated printer 7 and print media M from the image data, which is prepared by the user and is used to change the process content according to the characteristics of the printer 7 and the print media. In the printer driver 602, it is not required that the process content is strictly adapted to each of the print media with many different types of characteristics. In an example of a less complex print execution method, some standard processes corresponding to the print media are prepared in advance, such that the user can select any one of those processes for the print media. The print data to be transmitted from the printer driver 602 to the printer 7 includes raster data for each ink color of the printer 7 and information for designating the print media to be a target. The process for performing printing on the printer from the PC via the printer driver is a well-known process understood by those skilled in the art. Hereinafter, the description thereof is omitted.

In another exemplary embodiment, there is a scenario in which in order to obtain a printing product with higher image quality, the image data which is generated on the PC 6 is processed by the dedicated software called a raster image processor (RIP) or the hardware and the print data is generated. For example, in a high-quality and large format printer for businesses that is to be used in or by a printing company, because it takes a relatively long time (for example, several hours) to generate the print data, a dedicated RIP device may be installed separately from the PC 6 which is commonly used by the user. The RIP device can be realized by mounting the RIP software on the PC, for example.

FIG. 2 illustrates an example in which one PC among the PCs 6, which are connected to the LAN line 5 and configure the printing process system 1, is used as the RIP dedicated device on which the RIP software is mounted. Hereinafter, the PC to be used as the RIP dedicated device is referred to as a "RIP device" and the RIP device is distinguished from other PCs 6 with the reference numerical 6a. There may be a plurality of RIP devices 6a in the printing process system 1. In addition, the plurality of PCs 6, for example, all of the PCs 6 in the printing process system 1, may have a function as the RIP device.

When the image data is applied to the RIP device 6a from the PC 6, the RIP device 6a generates the print data from the image data and outputs the generated print data to the printer 7. Accordingly, the PC 6 is released from the process for generating the print data. In the RIP device 6a, by executing the RIP software which is recorded on the storage 63 by the CPU 61, the RIP application 611 is operated. As illustrated by a broken arrow in FIG. 2, the RIP application 611 executes the data generating process adapted to image data to be applied from the PC 6 and the print media based on the designation of the print media, generates the print data, and outputs the generated print data to the printer 7.

In this case, the RIP application 611 is used to execute the data generating process in accordance with the characteristics of the designated print media M. There are many types of the print media having different characteristics, and it is necessary that the process parameter in the data generating process is set according to the characteristics. Practically, there are a plurality types of the print media to be used in one printer 7, the process parameter which is necessary to generate the print data adapted to these print media is saved on the memory 62 or the storage 63 in advance as a look-up table (LUT) 612. Hereinafter, the process parameter and the LUT 612 will be described in detail. The RIP application 611 reads the process parameter corresponding to the designated print media M from the LUT 612 and applies the read process parameter to the data generating process. The print data which is transmitted from the RIP device 6a to the printer 7 also includes the raster data for each ink color of the printer 7 and the information designating the print media to be a target.

The controller 71 of the printer 7 which receives the print data controls the printer engine 72, executes the printing process adapting to the designated print media, and prints the image of the designated content on the print media M. Accordingly, the printing product is obtained. The printing parameter for executing the printing process which is adapted to the print media M is stored in a LUT 701 which is pre-set on the memory 73. The controller 71 reads the printing parameter corresponding to the designated print media M from the LUT 701, and applies the read printing parameter to the printing process. The printing parameter and the LUT 701 will be described in detail.

Both of the process parameter to be applied to the data generating process in the RIP device 6a and the printing parameter to be applied to the printing process in the printer 7 are applied from the management server 8. The details are as follows. For the various types of the print media which are distributed in the market, a media list 301 containing unique media information in the print media is provided in the data server 3, which is capable of communicating with the printing process system 1 via the Internet communication network 2. The media list 301 can be provided on the storage 33 of the data server 3, for example.

The media information includes information necessary for adapting the data generating process and the printing process to the print media, respectively. The process parameter and the printing parameter to be used in the data generating process and the printing process, respectively may be saved as a part of the media information without any change. More generally, the information which is capable of uniquely deriving the process parameter and the printing parameter based on the information may be included in the media information. Hereinafter, an example in which the process parameter and the printing parameter are included as a part of the media information will be described.

FIG. 3 is a diagram illustrating an example of a media list. The media list 301 is information necessary for adapting the data generating process in the RIP device 6a and the printing process in the printer 7 to the characteristics of the print media. In order to obtain the printing product with good quality, it is necessary optimize the process by the combination of the printer 7 and the print media M. Accordingly, the media information is prepared for each combination of the printer 7 and the print media M.

In the example of FIG. 3, the print media to be distinguished by symbols aaa, bbb, ccc, and the like are prepared as the type of the print media corresponding to a printer represented by a type AAA. In addition, the print media to be distinguished by symbols aaa, bbb, ddd, and the like are prepared as the type of the print media corresponding to the printer represented by a type BBB, and the print media to be distinguished by symbols eee, fff, ggg, and the like are prepared as the type of the print media corresponding to the printer represented by a type CCC. In this manner, many types of the print media may be distributed in the market. However, it is not necessary to prepare the media information for all of the combinations of the printer and the print media. The media information may be prepared for the print media which can be used in the printer or to be assumed for use by each type of the printer.

The media information is generated for each combination to be assumed of the printer and the print media. The information to be determined by the types of the print media caused by the characteristics of the print media and information to be determined by the combination of the print media and the printer are included in the media information. As an example of the information to be determined by the types of the print media, here, an international color consortium (ICC) profile that is an example of color profile information relating to the color development of the print media is exemplified. In the color conversion process during the data generating process, the ICC profile is information for reproducing the color tone of an original image with high accuracy on the print media and has practically standardized objectivity in the field of the image process.

On the other hand, as an example to be determined by the combination of the printer and the print media, the print setting information and the mechanical parameter are included in FIG. 3. The print setting information is information relating to the setting of the print condition in the printer side such as a resolution or an ink color, and indicates a print condition which is suitable for the print media among the print conditions which can be set by the printer. In addition, for example, the mechanical parameter is information relating to the mechanical setting of the printer for performing printing on the print media successfully, such as a transporting speed or a platen gap of the print media.

Among these information items, the ICC profile information and the print setting information are elements to be incorporated in the data generating process by the RIP device 6a, and these elements are used as the process parameter. On the other hand, the mechanical parameter is an element to be incorporated in the printing process by the printer 7, and is used as the printing parameter.

As described above, the media information includes the ICC profile information and the print setting information as the process parameter, and the mechanical parameter as the printing parameter. These sets of the information items are prepared in the media list 301 for each combination of the printer and the print media. The media information may further include the other information items. In addition, as described above, it may include the information that can uniquely estimate these parameters in place of directly or actually including the process parameter and the printing parameter.

The providing of the media list 301 can be performed by publishing the media information for the combination of the printer to be supplied by a supplier and the useable print media on the data server 3 which is operated by the supplier of the printer (printer maker or a sales company), for example. In addition, the supplier of the print media may apply a form for publishing the media information for the combination of the print media to be supplied by the supplier and the printer corresponding to the print media. In addition, the third party institution may apply a form for providing the media information in a cross-sectional manner for the combination of the printer to be supplied from various suppliers and the print media.

In addition, the media list 301 may be distributed to the user in a state where the media list 301 is recorded on a portable memory, which can be attached or or detached from the computer, or a suitable recording medium such as an optical disc. In a form in which the media list 301 is published on the Internet communication network 2 as described above, if the user is in the Internet connection environment, the user can acquire the media list 301. In addition, for an administrator of the media list 301, it is easy to reflect the information in the media list 301 when there is the addition, the elimination, and the change of the media information. In addition, there is an advantage in that the new information can be more rapidly distributed to the user.

Returning to FIG. 2, the description of the printing process system 1 will be continued. In the management server 8, by executing the control program which is recorded on the storage 83 by the CPU 81, various functional blocks such as an information acquisition unit 801, a parameter specifying unit 802, a printer management unit 803, and the parameter distribution unit 804 are realized. The parameter specifying unit 802 is mainly realized by the CPU 81 and a memory 82. In addition, the information acquisition unit 801, the printer management unit 803, and the parameter distribution unit 804 are mainly realized by the CPU 81 and an IF 84. In addition, the above function is realized in cooperation with the hardware of the management server 8 as needed.

The information acquisition unit 801 accesses the data server 3 via the Internet communication network 2 and acquires the media information corresponding to the print media to be used in the printing process system 1 from the media list 301. The parameter specifying unit 802 specifies the process parameter and printing parameter based on the acquired media information. In a case where the media information includes the process parameter and the printing parameter, the information corresponding to the process parameter and the printing parameter may be extracted from the media information items. In addition, in a case where the information for derivation of the process parameter and the printing parameter is included in the media information, these parameters can be specified by a predetermined operation based on the information.

The printing parameter among the specified parameters is transmitted to the printer 7. Specifically, the printer management unit 803 generates a table in which the printing parameter corresponding to one type or a plurality of types of print media to be used in the printer 7 is disclosed, and the table is read and stored on the memory 73 (or the storage) of the printer 7 and is set as the LUT 701.

FIG. 4 is a diagram illustrating an example of a look-up table of the printer. In the LUT 701 provided on the printer 7, a media number for discriminating a plurality of types of the print media is associated with the printing parameter (in this example, the mechanical parameter) corresponding to the print media specified by the media number. In the media list 301 on the data server 3, an individual name indicating the type of the print media is used. In the LUT 701 on the printer 7, the types of the print media are specified by a simpler media number.

As described above, the many types of the print media are distributed in the market, but the print media which can be used on one printer is only a part thereof. In addition, the print media are provided from the many suppliers and naming rules are not uniform therebetween. For example, in order to discriminate the various types of the print media which can be used on one printer, it is more convenient to manage using the simpler symbol (for example, a sequence number) rather than using the unique name to the individual print medium. In the example of FIG. 4, the printing parameter corresponding to 30 types of the print media to be discriminated by the numbers 1 to 30 can be saved on the LUT 701.

From the printer management unit 803 of the management server 8, the table in which the media number is associated with the printing parameter is transmitted to the printer 7. Accordingly, the management server 8 grasps a correspondence relationship between the printing parameter which is stored in the LUT 701 of the printer 7 and the media number.

Returning to FIG. 2 again, the description of the printing process system 1 will be continued. The process parameter which is specified from the media information in the parameter specifying unit 802 is transmitted to the RIP device 6a. Specifically, the process parameter is distributed from the parameter distribution unit 804 of the management server 8 with respect to the RIP device 6a having a function for generating the print data within the printing process system 1. In this time, the media numbers for specifying the print media corresponding to the process parameter are associated in the process parameter. The media number corresponds to the media number which is associated with the printing parameter. That is, the same media numbers are applied to the same print media in the information to be applied to the RIP device 6a and the printer 7. Since the media number which is associated with the printing parameter is managed by the management server 8, the same media number can be applied to the process parameter.

FIG. 5 is a diagram illustrating an example of a look-up table of the RIP device. There is a possibility that the different types of plurality of printers are connected to the printing process system 1, and in order to properly use the printers, the LUT 612 on the RIP device 6a is configured such that the process parameter can be stored for each printer type. The plurality of types of print media are distinguished by the media number with respect to one type of printer. The numbering rule is as described above, and the same media number is applied to the printing parameter and the process parameter corresponding to the same print media.

The ICC profile information as the process parameter is associated with the print setting information with respect to the print media to be specified with the media number and the associated ICC profile information and the print setting information are stored in the LUT 612. In order to clarify the relationship between the published information items on the data server 3, the media number and the unique information indicating the types of the print media are stored.

It is not necessary that information items of all of the print media which can be used in the printer are previously acquired. That is, it is not necessary that the user acquires all of the media information items which are published according to the using printer. The process parameter and the printing parameter may be prepared by acquiring only the media information for the print media to be actually used. In the media list 301 illustrated in FIG. 3, the types of the print media corresponding to a printer BBB are set as aaa, bbb, ddd, and the like. With respect to this, in the LUT 612 illustrated in FIG. 5, the types of the print media corresponding to the printer BBB are set as bbb, ddd, hhh, and the like. The difference therebetween is the setting type.

The content of the LUT may be partially different between the plurality of RIP devices 6*a* which are included in the same printing process system 1. However, it is necessary to apply the same media number to the same print media within one printing process system 1.

As described above, in the printing process system 1, the process parameter for adapting the data generating process in the RIP device 6*a* to the print media and the printing parameter for adapting the printing process in the printer 7 to the print media are specified from the media information which is published for each type of the print media on the Internet. More specifically, the management server 8 of the printing process system 1 accesses the data server 3 via the Internet communication network 2 and downloads the necessary media information from the media list 301 which is published on the data server 3.

The management server 8 specifies the process parameter and the printing parameter from the media information, associates the media numbers for specifying the printing parameter and the print media, and stores the associated numbers on the LUT 701 of the printer 7 for executing the printing process. In addition, the management server 8 associates the media numbers for specifying the process parameter and the print media and transmits the associated numbers to the RIP device 6*a* for executing the data generating process. Therefore, the printing parameter which is stored in the LUT 701 of the printer 7 is associated with the process parameter which is stored in the LUT 612 of the RIP device 6*a* via the common media number.

Accordingly, when the image which is generated by the user by operating the PC 6 is processed in the RIP device 6*a* and printed by the printer 7, there is a possibility that the designation of the print media to be incorporated in the print data is performed by the media number. That is, the media numbers of the print media corresponding to the process parameter which is used in the data generating process in which the RIP device 6*a* generates the print data are transmitted to the printer 7 as a part of the print data. The printer 7 performs the printing process using the printing parameter corresponding to the media number included in the print data. Accordingly, the types of the print media to be a target of the data generating process in the RIP device 6*a* are always matched with the types of the print media to be a target of the printing process in the printer 7.

If the types of the print media to be a target of the data generating process are different from the types of the print media to be a target of the printing process, a desired print quality cannot be obtained, for example, when the color degree in the printing product is different from the color degree which is obtained by the user, the clarity of the image is deteriorated, and the printing fails in the remarkable cases. In the related general printing process system, the setting relating to the print media is performed by an individual user operation between the PC (RIP device) and the printer. Therefore, there is the inconsistency between the setting of the PC side and the setting of the printer side. The print quality which is obtained by the user cannot be obtained in the printing product due to the inconsistency. In particular, in the management by the media number which does not directly indicate the types of the print media, it is difficult to detect that the print media to be specified by the same media numbers are inconsistent between the PC and the printer.

In the printing process system 1 of the present embodiment, any of the acquisition of the media information from the data server 3, a specifying of the process parameter and the printing parameter based on the media information, the setting of the printing parameter to the printer 7, and the distribution of the process parameter to the RIP device 6*a* is integrally performed by the management server 8. The association of the process parameter and the printing parameter and the media number is also performed by the management server 8. Therefore, the setting of the process parameter in the RIP device 6*a* and the setting of the printing parameter in the printer 7 are associated with the same print media by the common media number. Accordingly, it is avoided that the print media to be a target between the process in the RIP device 6*a* and the process in the printer 7 are different from each other. According to this, the user with respect to the various types of print media can obtain the printing product with a desired quality.

Hereinafter, since the above-described management can be performed, each configuration element of the printing process system 1, that is, operations of the management server 8, the RIP device 6*a*, and the printer 7, will be described in detail. The concept of the print management in the printing process system 1 is as above-described. In the operation of each unit to be described in below, a process for making the management function more effectively is added.

Figure 6:
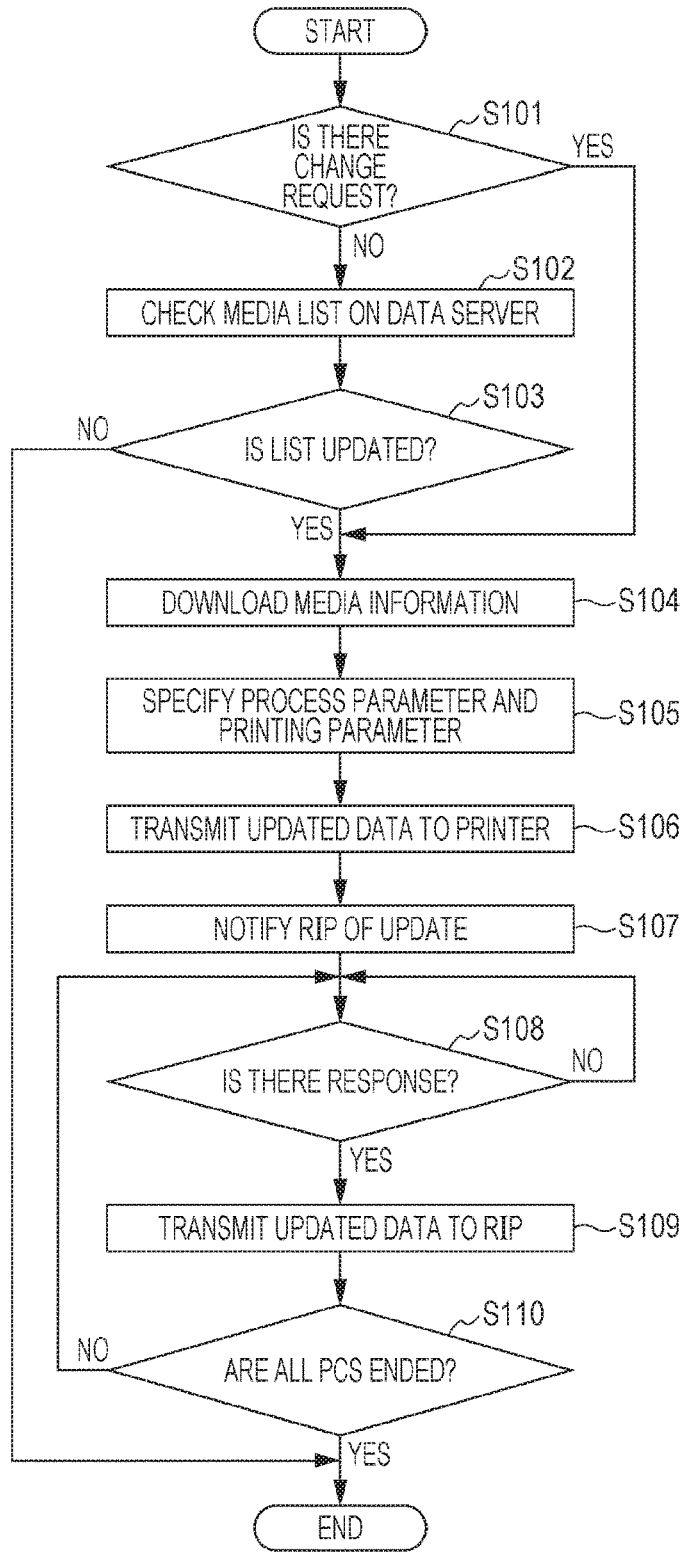
FIG. 6 is a flow chart illustrating a process in a management server.

FIG. 6 is a flow chart illustrating a process in a management server. The process is periodically executed by executing the control program which is recorded in the storage 83 in advance by the CPU 81, which is provided in the management server 8, and performing a predetermined operation defined by the program on each unit of the management server 8. The process is a process for maintaining the latest LUT 612 and the LUT 701 by continually updating the LUT 612 which is provided in the RIP device 6*a* and the LUT 701 which is provided in the printer 7.

In this process, a presence and absence of the change request of a registration content such as a new registration of the print media to the printing process system 1 or the correction of the setting is checked by the user (step S101). In the printing process system 1, it is possible to previously register 30 types of the print media using the media numbers 1 to 30. In this manner, for the printing to the registered print media, it is possible to rapidly print the media without the new information acquisition. There is a case where the user desires to change the registration content such as a new registration of unregistered print media, the canceling of the registered print media, and updating of the information relating to the registered print media.

In order to receive such a requirement, step S101 is provided. The change request can be performed by sending out a signal of the change requirement from the PC 6 to the management server 8 by the operating of the PC 6 by the user. Specifically, when the user performs the operation of inputting of a message for desiring or requesting the change of the registration content to the input unit 65 of the PC 6, the corresponding signal is transmitted to the CPU 81 via the IF 84 of the management server 8 which is sent out from the PC 6.

In a case where the change request from the user is present (YES in step S101), the process proceeds to a step S104. When there is no change request (NO in step S101), the CPU 81 performs a checking of the media list 301 on the data server 3 (step S102).

The administrator of the data server 3 performs the addition or the elimination of the print media which publishes the media information or the updating of the published information according to the distribution state of the print media. By checking the update history, the CPU 81 determines whether the information for the registered print media is updated (step S103). If the information is updated, step S104 is executed, and if the information is not updated, steps following step S104 are skipped.

In step S104, the media information relating to the print media that the user desires to obtain or the print media that the update required among the print media included in the media list 301 published on the data server 3 is downloaded. One type of print medium to be a target may be used and a plurality of print media to be a target may be used.

The CPU 81 specifies the process parameter and the printing parameter corresponding to the print media from the media information acquired in the above manner (step S105). The obtained printing parameter and the media number are transmitted to the printer 7 as the update data (step S106), the LUT 701 of the printer 7 is updated by the update data. There is a case where the printer 7 cannot be detected in the printing process system 1 for reasons such as that the power of the printer 7 is not applied or a communication cable is not connected. In this case, when the next printer 7 is detected in the printing process system 1, it is preferable to perform the update before the printing process is executed by the printer 7.

It is preferable that the update of the LUT 701 be performed as follows. The management server 8 acquires the content of the present LUT 701 from the printer 7, updates the content using the printing parameter which is newly acquired, and rewrites the LUT 701 of the printer 7 to date after updating. There is a case where confusion occurs when a plurality of devices having a function as the management server on the printing process system 1 are present, for example, by only transmitting the new printing parameter to the printer 7. That is, when the LUT 701 of the printer 7 is updated from each of the plurality of management servers, there is a case in which the information items which are managed on each management server are actually inconsistent with the LUT 701 of the printer 7. By performing the update by reading the content of the present LUT 701, the problem is avoided. When there are a plurality of printers 7 in the system, the processes are executed with respect to the printer 7 that the update of the printing parameter requires.

In addition, the management server 8 performs the notification of the message in which the update of the process parameter is present with respect to the RIP device 6a in the printing process system 1 (step S107). It is not required that all of the RIP devices 6a in the printing process system 1 be in the operation state. The management server 8 notifies the RIP device 6a of the update of the process parameter, and when the notification is received and the reply is present from the RIP device 6a (step S108), the update data is transmitted to the RIP device 6a (step S109). The update data is data in which the process parameter or the like is read instead of the printing parameter of the LUT 701, which is updated in the printer 7.

When a plurality of RIP devices 6a are present in the printing process system 1, the management server 8 sequentially transmits the update data with respect to the RIP device 6a having the replay. The transmission is repeated until the transmission with respect to all of the RIP devices 6a in the system is ended. Accordingly, the content of the LUT 612 in all of the RIP devices 6a which are operated in the printing process system 1 corresponds to the LUT 701 of the printer 7. Therefore, it is avoided that the print media to be a target between the data generating process in the RIP device 6a and the printing process in the printer 7 are inconsistent with one another.

Figure 7:
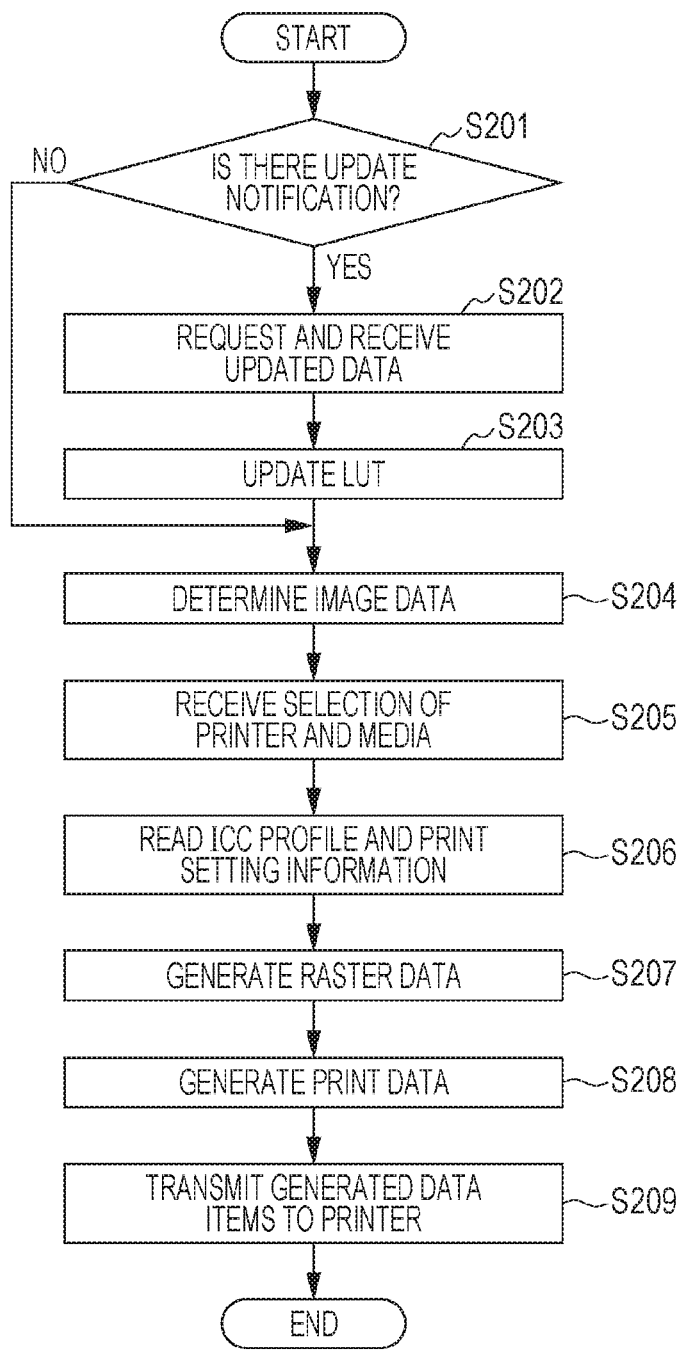
FIG. 7 is a flow chart illustrating a data generating process by the RIP device.

FIG. 7 is a flow chart illustrating the data generating process by the RIP device. The process is realized by performing a predetermined operation, which is defined on the program, on each unit of the RIP device 6a by executing the control program which is recorded in the storage 63 in advance, by the CPU 61, which is provided on the RIP device 6a. This process is a process for causing the printer 7 to perform the printing process by generating the print data by the RIP device 6a and transmitting the generated print data to the printer 7.

In the RIP device 6a, it is determined whether the notification relating to the update of the process parameter is present from the management server 8 (step S201), and when there is the notification (YES in step S201), the update of the process parameter is performed in response thereto. Specifically, the RIP device 6a requests the transmitting of the update data with respect to the management server 8 from the IF 64 via the LAN line 5, and receives the update date to be transmitted from the management server 8 according to the request (step S202). By the received update data, the LUT 612 is updated (step S203). If there is no notification relating to the update (NO in step S201), steps S202 and S203 are skipped. By performing the update of the process parameter prior to the generation of the print data, it is possible to provide the latest process parameter to the data generating process.

In addition, in the RIP device 6a, the image data indicating the image content to be printed is decided (step S204). In a case where the PC 6 and the RIP device 6a are different computer apparatuses in which the appropriate image edit application 601 is mounted and the image edit work is performed by the user, the RIP device 6a decides the image data by receiving the image data which is generated on the PC 6. In addition, in a case where the image edit application 601 is mounted on the PC which serves as the RIP device 6a, for example, the user decides the image data by operating the image edit application 601 and editing the image.

In addition, by the operation input of the user with respect to the input unit 65 of the PC 6 or the RIP device 6a, the selection of the printer 7 which executes the printing process and the print media on which the printing of of the image is performed, and finally, the selection is received by the RIP device 6a (step S205). Accordingly, the data items to be collected are collected prior to the printing process being performed by the printer 7. The decision of the image data, the selection of the printer 7, the selection of the print media, and the update of the LUT are independent processes. It is not always necessary to execute the processes in the order shown here.

The CPU 61 of the RIP device 6a generates the print data using the collected data. The process parameter corresponding to the print media which is designated by the user, that is, the ICC profile and the print setting information, are read from the LUT 612 (step S206). The raster data in which the image to be printed and that is developed for each ink color of the printer 7 is generated by a raster data generating process to which the process parameters are applied (step S207).

Furthermore, the CPU 61 generates the print data including the generated raster data and the media number indicating the print media which is designated by the user (step S208). The generated print data is transmitted to the printer 7 (step S209). The print data is transmitted from the IF 64 to the LAN line 5, and the print data is received by an IF 74 of the printer 7.

Figure 8:
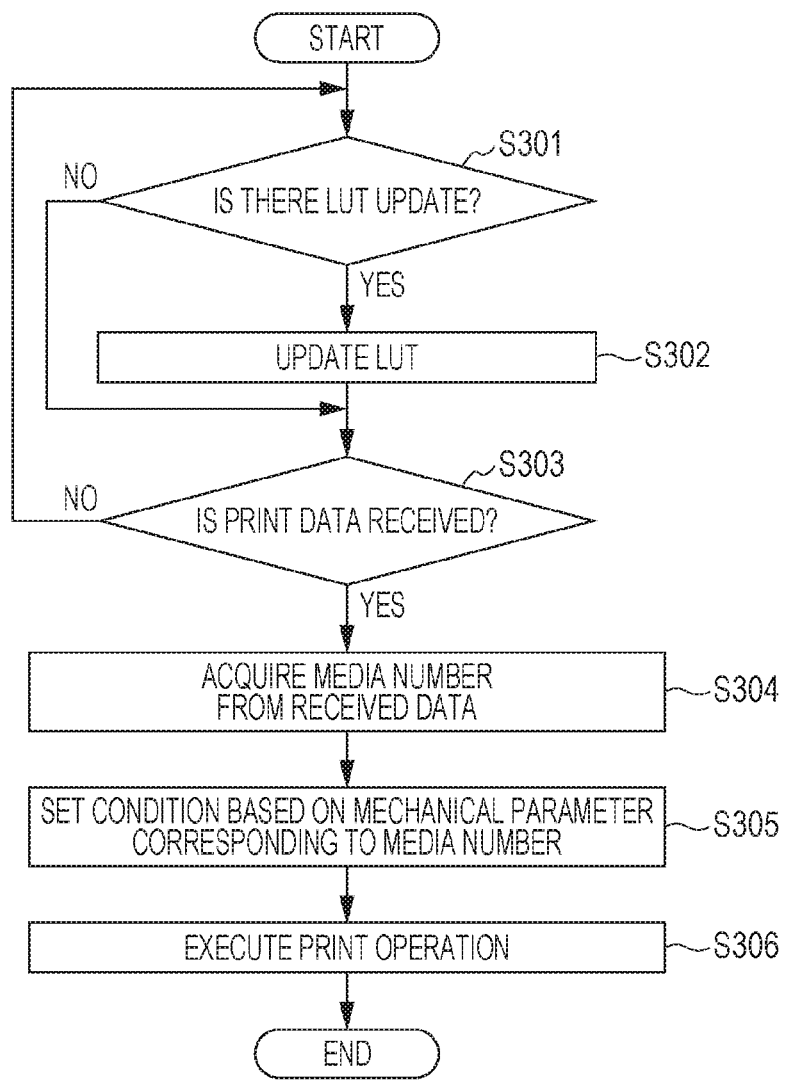
FIG. 8 is a flow chart illustrating a printing process by the printer.

FIG. 8 is a flow chart illustrating the printing process by the printer. The process is realized by performing a predetermined operation, which is defined on or by the program of each unit of the printer 7, by executing the control program which is recorded in the storage 63 in advance, by the controller 71 which is provided on the printer 7. The process is a process for causing the printer 7 to perform the printing process by receiving the print data which is generated by the RIP device 6a for the printer 7.

The IF 74 of the printer 7 receives access from the management server 8 for updating the printing parameter (LUT 701). When the access for updating is provided from the management server 8 (YES in step S301), the controller 71 receives access to update the LUT 701 (step S302). Accordingly, the LUT 701 is continually updated, and the latest state is always maintained.

In addition, the printer 7 continually receives the print data to be transmitted from the RIP device 6a via the LAN line 5. When the print data is received (YES in step S303), the controller 71 acquires the information indicating the media number from the received print data (step S304). Furthermore, the controller 71 reads the printing parameter (mechanical parameter) corresponding to the print media to be specified with the media number by referring to the LUT 701 based on the media number, and sets the operation conditions of each unit of the printer engine 72 according to the mechanical parameter (step S305).

The printer engine 72 executes the printing operation under the set operation conditions (step S306). Specifically, the printer engine 72 forms a color image, which is formed by overlapping a single color image of the ink color in accordance with the raster data included in the print data on the print media M which is specified with the media number. Accordingly, the user completes the desired printing.

As described above, in the printing process system 1 of the embodiment, in order to realize the printing which is adapted to the print media M, when the data generating process for generating the print data in the RIP device 6a is executed, the process parameter in accordance with the characteristics of the print media is applied, and when the printing process is executed in the printer 7, the printing parameter in accordance with the characteristics of the print media is applied. The print data which is generated by the data generating process is received and transmitted from the RIP device 6a to the printer 7 and the printing process is executed by the printer 7.

When the print media to be a target between the data generating process in the RIP device 6a and the printing process in the printer 7 are inconsistent with one another, the user does not obtain a desired print quality. In one exemplary embodiment, the media number as the information specifying the print media is included in the print data to be applied from the RIP device 6a to the printer 7. The process parameter which is held by the RIP device 6a is associated with the printing parameter which is held by the printer 7 via the media number.

Specifically, the management server 8 is provided in the printing process system 1, and the management server 8 acquires the media information relating to the necessary print media from the data server 3 which publishes unique media information of the various types of print media via the Internet communication network 2. In addition, the management server 8 specifies the process parameter and the printing parameter from the acquired media information and transmits these parameters and the media number for discriminating the plurality of print media and specifying each of the print media to the RIP device 6a and the printer 7.

In the RIP device 6a for generating the print data, it is possible to generate the print data which is adapted to the print media by the data generating process using the applied process parameter. In addition, in the printer 7, it is possible to execute the printing operation which is adapted to the print media by the printing process using the applied printing parameter. The print media to be a target between the data generating process and the printing process are the same. Therefore, in the printing process system 1, it is possible to execute the printing with a printing quality in accordance with the requirement of the user.

As described above, in one exemplary embodiment, the PC which serves as the RIP device 6a corresponds to the "data processing unit" of at least one exemplary embodiment of the invention, and the printer 7 serves as the "printer" of at least one exemplary embodiment of the invention. The memory 73 (or the storage) storing the LUT 701 which is provided in the printer 7 corresponds to the "storage unit" of at least one exemplary embodiment of the invention.

In addition, the management server 8 includes functions as the "parameter management unit" and the "printing management device" of the invention. In the management server 8 which serves as the "printing management device", the information acquisition unit 801, the parameter specifying unit 802, the printer management unit 803, and the parameter distribution unit 804 serve as the "information acquisition unit", the "parameter specifying unit", the "printing parameter setting unit", and the "process parameter transmitting unit" of at least one exemplary embodiment of the invention, respectively. In addition, the IF 84 which receives a signal in accordance with the requirement of the user relating to the update of the parameter corresponds to the "receiving unit" of at least one exemplary embodiment of the invention. In addition, the media number which is associated with the process parameter and the printing parameter corresponds to the "media specifying information" of at least one exemplary embodiment of the invention.

Exemplary embodiments of the invention were described above, but the invention is not limited to or by the above embodiments, and various modifications are possible without departing from the gist of the invention. For example, the printing process system 1 of the above-described embodiments acquires the media information from the data server 3 of the outside via the Internet communication network 2. However, in the concept of the printing process system according to at least one exemplary embodiment of the invention, it may be considered that the data server itself is one of the configuration elements of the printing process system.

In addition, for example, in the above-described embodiments, a user requirement for enabling the new print media to be used in the printing process system 1 is performed by the operation input of the user to PC 6. Instead of the operation or in addition to the operation, a configuration in which the operation input of the user is performed via the input unit 65 of the RIP device 6a or the input unit (not illustrated) of the management server 8 may be provided. In the configuration that the acquisition of the media information is performed by the operation input to the input unit of the management server 8, the input unit serves as the "receiving unit" of at least one exemplary embodiment of the invention.

In addition, for example, in the above-described embodiments, a management server 8 as a dedicated server for centrally managing the process parameter and the printing parameter corresponding to the print media in the system are provided. However, as described above, the function as the management server 8 can be realized using a hardware configuration of the general computer apparatus. From the viewpoint, it is also possible that the software for realizing the function as the management server is mounted on at least one PC 6 which is included in the printing process system 1 and on which the image edit application 601 or the RIP application 611 is mounted and the function as the management server is provided in the PC. In this case, the dedicated management server is not necessary. That is, the program described in the software and the recording medium in which the program is recorded are included in the exemplary embodiments of the invention.

In addition, for example, the data server 3 and the management server 8 in the above-described embodiments may be used for the purpose of supplying the parameter for exclusively adopting the various processes in the printing process system 1 to the characteristics of the print media. However, in addition to this, for example, update information such as the firmware of the printer driver or the printer 7 is provided or the function for remotely monitoring consumable goods such as an ink may be included in these devices.

In addition, in the above-described LUT 612 of the RIP device 6a or the LUT 701 of the printer 7, the process parameter or the printing parameter is associated with the media number. However, in addition to this, identification information (here, referred to as an "update ID") for managing an update history of the parameter may be used. As the update ID, for example, time stamp information indicating a time when the management server 8 downloads the media information or a time when the printing parameter of the printer 7 is updated, or a numerical value indicating the number of the updates can be used.

In this case, when the media number is received and transmitted from the RIP device 6a to the printer 7, by adding the update ID, it is possible to confirm whether the process parameter and the printing parameter which are associated by the media number correspond to the same print media. That is, if a combination of the media number and the update ID which is received by the printer 7 is not matched with the combination which is held by the printer 7, the process parameter and the printing parameter are updated by the different timings, and there is a possibility that any one of the parameters is changed. For example, when such a state is detected, by stopping the process or notifying the user of the state, it is avoided that the printing is executed under inappropriate conditions.

In addition, both of the ICC profile information or the print setting information exemplified as the process parameter and the mechanical parameter exemplified as the printing parameter illustrate some examples. In addition to this or instead of this, it is possible to use various types of parameters to be set in accordance with the characteristics of the print media. In addition, as the "media specifying information" of the invention for specifying the print media in the LUT, an arbitrary symbol or name which can discriminate between the plurality of registered print media can be used in addition to the above-described media number.

In addition, for example, in the printing process system 1 of the present embodiments, the PC 6, the RIP device 6a, the printer 7, and the management server 8 are connected to the LAN line 5 which is connected to the Internet communication network 2, in parallel. However, from the viewpoint of the further improvement of the security, in order to more reliably perform an uniform management of the process parameter and the printing parameter, a configuration in which the printing process system is configured as an intranet in which the LAN line 5 is not connected to the Internet communication network 2 and only the management server 8 has the Internet environment may be provided.

What is claimed is:

1. A printing process system comprising:
a data processing device that generates print data using a process parameter;
a printer that executes a printing process using a printing parameter; and
a parameter management server,
wherein the parameter management server specifies media information that includes at least one printing parameter and at least one process parameter optimized for each combination of a print media type and a printer model,
wherein the parameter management server transmits one or more process parameters included in the media information to the data processing device, wherein each process parameter transmitted to the data process device is associated with and optimized for generating print data in accordance with a combination of a print media type and a printer model,
wherein the parameter management server transmits one or more printing parameters included in the media information to the printer, wherein each printing parameter transmitted to the printer is associated with and optimized for executing the printing process in accordance with a combination of a print media type and a printer model associated with the printer,
wherein the data processing device acquires the one or more process parameters included in the media information from the parameter management server, and generates the print data using a process parameter selected from among the acquired process parameters based on a target print media type and a target printer model,
wherein the data processing device transmits the generated print data to the printer, wherein the print data includes information which designates the target print media type,
wherein the printer acquires the one or more printing parameters included in the media information from the parameter management server, stores the acquired printing parameters on a storage unit, and executes the printing process using a printing parameter selected from among the printing parameters stored in the storage unit based on the target print media type designated by the print data from the data processing device.

2. The printing process system according to claim 1, wherein the parameter management server acquires the media information corresponding to desired print media from an external data server.

3. The printing process system according to claim 2, wherein the parameter management server includes a receiving unit that receives a designation input relating to the print media and acquires the media information corresponding to the print media designated by the received designation input.

4. The printing process system according to claim 1, wherein the storage unit stores the printing parameter and the media information corresponding to at least one print medium.

5. The printing process system according to claim 1, wherein the data processing device, the printer, and the parameter management server are mutually connected via a local area network.

6. The printing process system according to claim 1, wherein when the media information is newly acquired, the parameter management server updates the printing parameter and the media information in the storage unit based on update history of the print parameter.

7. The printing process system according to claim 1, wherein when the media information is newly acquired, the parameter management server informs the data processing device of one or more updates to the process parameter.

8. The printing process system according to claim 1, wherein the process parameter is transmitted according to a requirement relating to the print media designated by the media information from the data processing device.

9. A printing management device that manages a printing process system including a data processing device that generates print data using a process parameter selected by the data process device in accordance with a target print media type and a target printer model, and a printer that executes a printing process using a printing parameter selected by the printer in accordance with the target print media type designated by the print data from the data process device, the device comprising:
    an information acquisition unit that acquires media information for adapting a data generating process executed by the data processing device and the printing process executed by the printer;
    a parameter specifying unit that specifies the media information, wherein the media information includes at least one printing parameter and at least one process parameter optimized for each combination of a print media type and a printer model;
    a printing parameter setting unit that transmits one or more printing parameters included in the media information to the printer, wherein at least one of the transmitted printing parameters is associated with and optimized for executing the printing process in accordance with a combination of the target print media type and the target print model associated with the printer; and
    a process parameter transmitting unit transmits one or more process parameters included in the media information to the data processing device, wherein at least one of the transmitted process parameters is associated with and optimized for executing the data generating process to generate print data in accordance with the combination of the target print media type and the target printer model of the printer.

10. A printing apparatus in a printing system including:
    a data processing device that generates print data using a process parameter selected by the data process device in accordance with a target print media type and a target printer model, wherein the print data includes information for designating the target print media type;
    a printing apparatus that executes a printing process using a printing parameter selected by the printer in accordance with the target print media type designated by the print data; and
    a parameter management server that specifies media information that includes at least one printing parameter and at least one process parameter optimized for each combination of a print media type and a printer model;
    wherein the parameter management server transmits one or more printing parameters included in the media information to the printer, wherein each printing parameter transmitted to the printer is associated with and optimized for executing the printing process in accordance with a combination of a print media type and a printer model associated with the printer,
    wherein the printing apparatus acquires the one or more printing parameters included in the media information from the parameter management server, stores the acquired printing parameters on a storage unit, and executes the printing process using a printing parameter selected from among the printing parameters stored in the storage unit based on the target print media type designated by the print data from the data processing device.

11. The printing process system according to claim 6, further comprising a plurality of parameter management servers, wherein each of the parameter management servers can update the printing parameter and the media information in the storage unit.

* * * * *